(12) United States Patent
Cohen et al.

(10) Patent No.: US 8,924,619 B2
(45) Date of Patent: Dec. 30, 2014

(54) UNIFIED MESSAGE-BASED COMMUNICATIONS

(71) Applicant: LSI Corporation, San Jose, CA (US)

(72) Inventors: Earl T. Cohen, Oakland, CA (US); Mark vonGnechten, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/864,494

(22) Filed: Apr. 17, 2013

(65) Prior Publication Data

US 2014/0281057 A1     Sep. 18, 2014

Related U.S. Application Data

(60) Provisional application No. 61/789,574, filed on Mar. 15, 2013.

(51) Int. Cl.
*G06F 13/16* (2006.01)
*G06F 5/06* (2006.01)

(52) U.S. Cl.
CPC ......................... *G06F 5/065* (2013.01)
USPC ................. 710/305; 710/33; 710/52

(58) Field of Classification Search
None
See application file for complete search history.

(56) References Cited

U.S. PATENT DOCUMENTS

| | | | |
|---|---|---|---|
| 5,949,981 A | 9/1999 | Childers | 395/309 |
| 7,143,227 B2 * | 11/2006 | Maine | 710/306 |
| 7,761,624 B2 | 7/2010 | Karamcheti et al. | 710/62 |
| 7,761,625 B2 | 7/2010 | Karamcheti et al. | 710/62 |
| 7,970,919 B1 | 6/2011 | Duran | 709/230 |
| 8,112,584 B1 * | 2/2012 | Williams et al. | 711/118 |
| 8,125,677 B2 | 2/2012 | Shestak et al. | 358/1.18 |

* cited by examiner

*Primary Examiner* — Cheng-Yuan Tseng
(74) *Attorney, Agent, or Firm* — Christopher P. Maiorana, PC

(57) ABSTRACT

A system includes a plurality of processors, a message fabric, and a plurality of hardware units. Each of the plurality of processors comprises a plurality of communication FIFOs and has an instruction set including at least one instruction to send a message via at least one of the plurality of communication FIFOs. The message fabric couples the processors via at least some of the plurality of communication FIFOs. Each of the processors is associated with a respective one or more of the hardware units and coupled to each of the associated hardware units via respective hardware unit input and output communication FIFOs. Each of the processors is enabled to send messages to others of the processors via respective processor output communication FIFOs. The respective hardware units associated with each of the processors are enabled to send messages to the associated processor via the respective hardware unit input communication FIFOs.

20 Claims, 7 Drawing Sheets

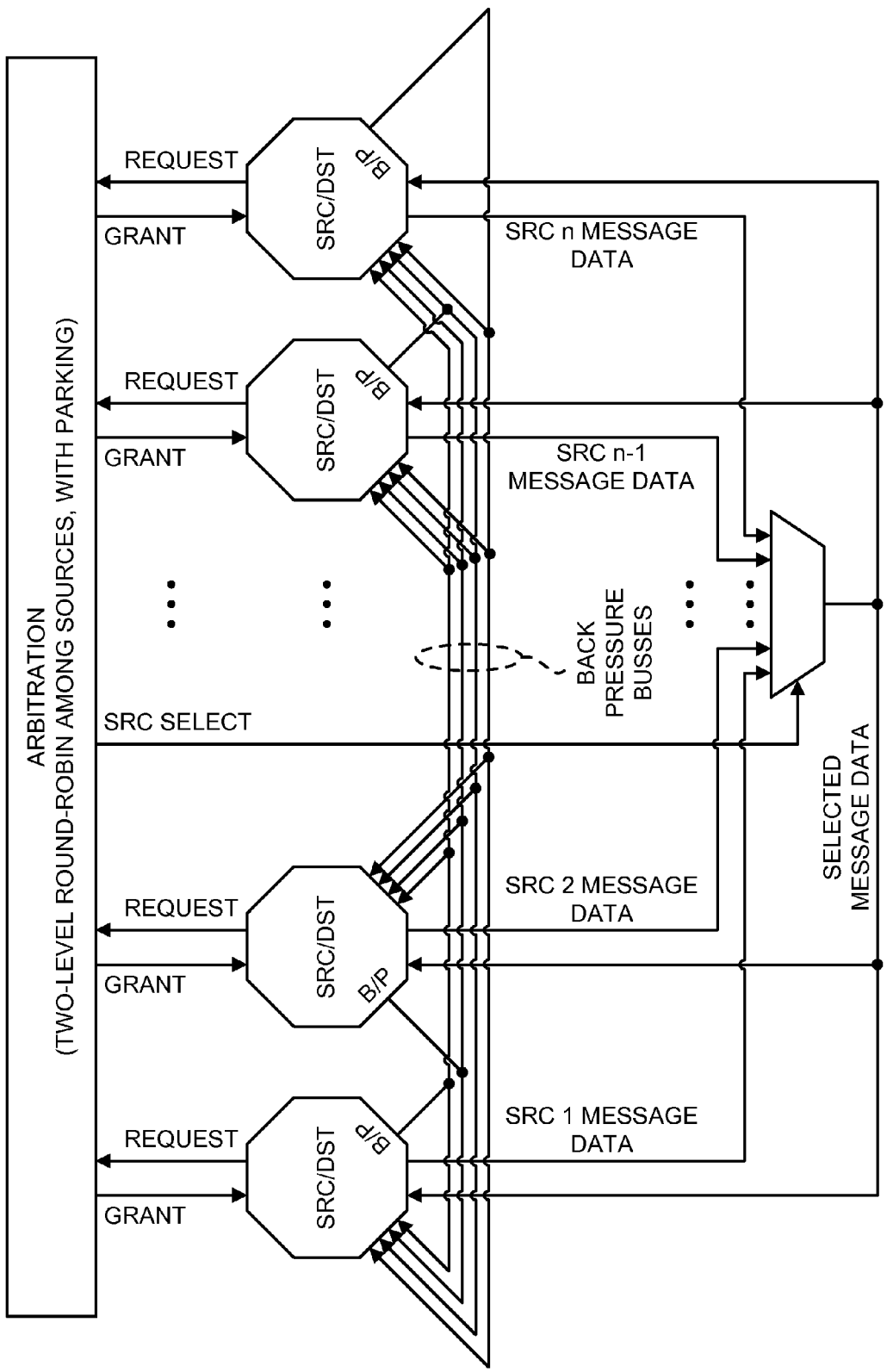

UNIFIED MESSAGE-BASED COMMUNICATIONS

This application relates to U.S. Provisional Application No. 61/789,574, filed Mar. 15, 2013, which is hereby incorporated by reference in its entirety.

FIELD OF THE INVENTION

The present invention relates to processor communications generally and, more particularly, to a method and/or apparatus for implementing unified message-based communications.

BACKGROUND

Message-based communication is used in some software systems. Such software systems often use shared memory to pass messages. In contrast, processors generally access hardware via a low-speed control/status register (CSR) bus, such as by using an AHB, AMBA, AXI, or PIF (Peripheral Interface) bus in a master mode. The CSR busses tend to have relatively low bandwidth, particularly for reads by the processor, which tend to be single-threaded.

Embedded controllers, such as a multi-processor solid-state drive (SSD)/non-volatile memory controller, need both fast inter-processor communication and fast control of hardware assists, such as direct memory access (DMA) engines or look-up engines. A conventional approach is to build hardware communication into attached memories of the processor, such as a tightly-coupled data memory that the processor can access via load/store, and the peripherals can access via the ABB, AMBA, AXI, or PIF bus in a slave mode. The conventional approach, however, single-threads access by the peripherals to the shared memory, and also imposes a relatively high management overhead on the processor.

It would be desirable to implement unified message-based communications.

SUMMARY

The invention concerns a system including a plurality of processors, a message fabric, and a plurality of hardware units. Each of the plurality of processors comprises a plurality of communication FIFOs. Each of the processors has an instruction set including at least one instruction to send a message via at least one of the plurality of communication FIFOs. The message fabric couples the processors via at least some of the plurality of communication FIFOs. Each of the processors is associated with a respective one or more of the hardware units and coupled to each of the associated hardware units via a respective hardware unit input one and via a respective hardware unit output one of the plurality of communication FIFOs. Each of the processors is enabled to send messages to others of the processors via respective processor output ones of the plurality of communication FIFOs. The respective hardware units associated with each of the processors are enabled to send messages to the associated processor via the respective hardware unit input ones of the plurality of communication FIFOs.

BRIEF DESCRIPTION OF THE FIGURES

Embodiments of the invention will be apparent from the following detailed description and the appended claims and drawings in which:

FIG. 5 is a diagram illustrating an example method for handling message fabric arbitration and back pressure in accordance with an embodiment of the invention;

DETAILED DESCRIPTION OF EMBODIMENTS

Embodiments of the invention include providing a method and/or apparatus for implementing unified message-based communications that may (i) provide a unified, message-based scheme for both processor-to/from-processor and processor-to/from-hardware unit communication, (ii) simplify firmware by providing a uniform mechanism for all "fast-path" processor communication, (iii) use a processor message fabric for hardware-to-hardware messages, (iv) implement messages comprising "operation tags" that are common for all messages associated with a particular I/O (or internal) operation, (v) enable multiple processors to more easily cooperatively communicate, via messages, with each other and with multiple hardware units, and/or (vi) be implemented in embedded controllers such as multi-processor solid-state drive (SSD)/non-volatile memory (NVM) controllers.

In various embodiments, each of two or more processors comprises a plurality of first-in-first-out (FIFO) buffer-based (FIFO-based) communication paths for sending and receiving messages both to and from the processors and to and from one or more hardware units. Incorporating instructions to send/receive messages into the processor instruction set enables more efficient communication. Using the FIFO-based communications both for inter-processor and processor-to/from-hardware communications simplifies firmware running on the processors and enables higher performance of a multiprocessor controller, such as an SSD/NVM controller.

Figure 1:
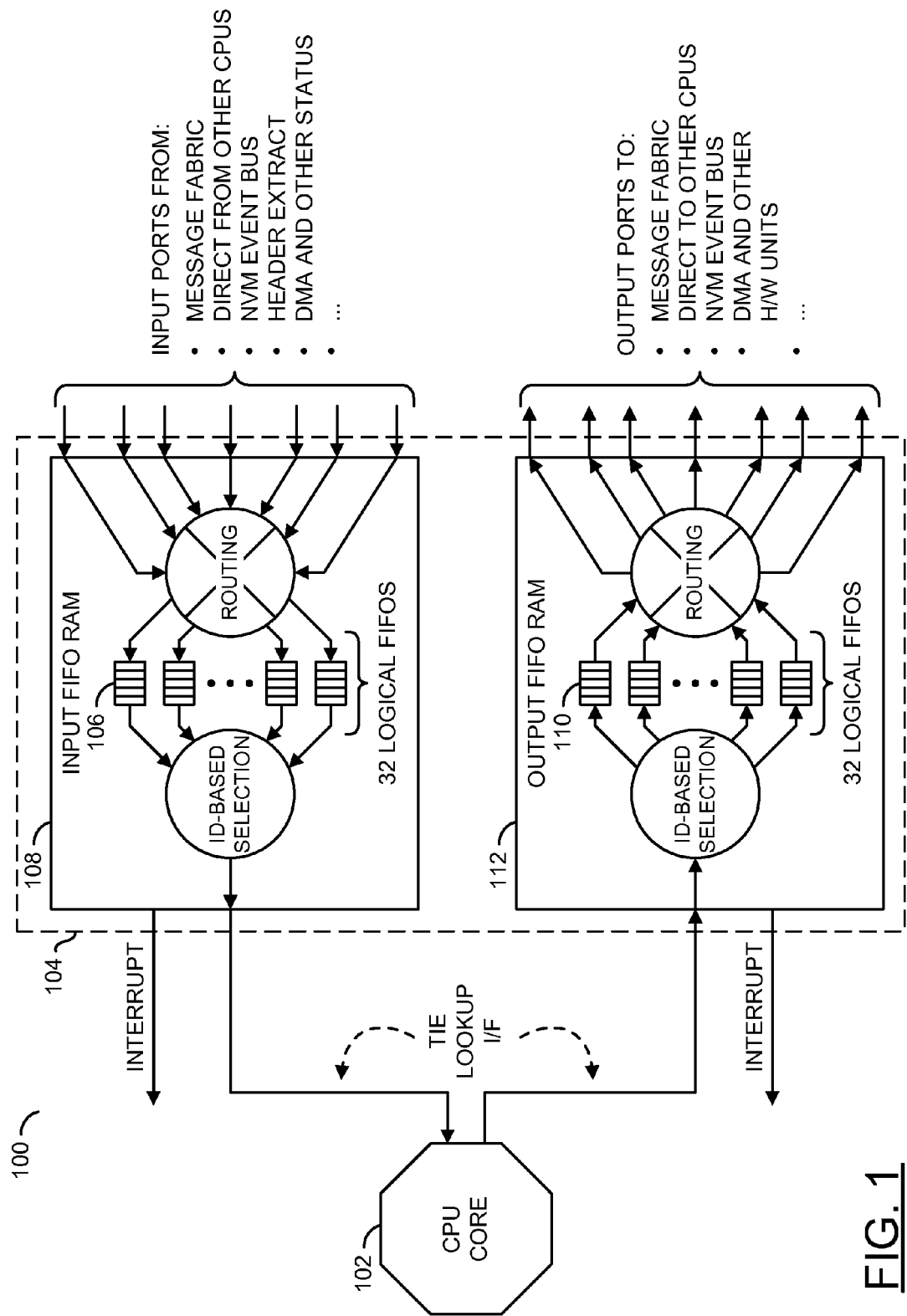
FIG. 1 is a block diagram illustrating an embodiment of a processor incorporating a plurality of communication FIFOs in accordance with an embodiment of the invention.

Referring to FIG. 1, a block diagram is shown illustrating an embodiment of a processor 100 incorporating a plurality of communication FIFOs in accordance with an embodiment of the invention. In some embodiments, the processor 100 comprises a central processing unit (CPU) core 102 and a plurality of FIFO communication buffers 104. An interface of the CPU 102 is used to access the plurality of FIFO communication buffers 104. In some embodiments using a Tensilica CPU, the interface is a Tensilica Instruction Extension (TIE) look-up interface. According to various embodiments, each of the FIFO communication buffers 104 is one or more of: a FIFO input communication buffer; a FIFO output communication buffer; a FIFO input and output communication buffer; coupled to a message fabric connecting a plurality of processors and/or hardware units; directly coupled to one of the processors; directly coupled to a hardware unit; on a broadcast bus connecting a plurality of processors and/or hardware units; or otherwise interconnected to one or more others of the FIFO communication buffers and/or hardware units. The term FIFO generally refers to a first-in-first-out buffer.

According to various embodiments, the instruction set of the processor 100 comprises one or more of: an instruction to push (store) a quantity of data, such as a word (four bytes) or a doubleword (eight bytes), into a selected one of the output communication FIFOs; an instruction to pop (retrieve) a quantity of data, such as a word or a doubleword, from a selected one of the input communication FIFOs; a FIFO status instruction that returns FIFO status information of a selected one of the communication FIFOs; and other instructions to read from, write to, pop from, push to, get status of, and/or manage one or more of the communication FIFOs.

According to various embodiments, the FIFO status information returned by the FIFO status instruction comprises one or more of: an amount of free data space in the selected FIFO; an amount of used data space in the selected FIFO; messages free in the selected FIFO; messages used in the selected FIFO; configured depth of the selected FIFO; interrupt status of the selected FIFO; and other information. In some embodiments, the instruction set comprises, for example, a FIFO push instruction, a FIFO pop instruction, and a FIFO status instruction.

The FIFO push instruction has an input, such as a constant field or a specification of a processor register containing a value, specifying which one of a plurality of output communication FIFOs to push a quantity of data into. The quantity of data is specified in one or more processor registers. The FIFO pop instruction has an input, such as a constant field or a specification of a processor register containing a value, specifying which one of a plurality of input communication FIFOs to pop a quantity of data from. The quantity of data is written into one or more processor registers. The FIFO status instruction has an input, such as a constant field or a specification of a processor register containing a value, specifying which one of a plurality of input or output communication FIFOs to return status for. The status is written into in one or more processor registers.

Both the input FIFOs 106 and the output FIFOs 110 report status to the CPU 102 via maskable interrupt status bits (e.g., one per FIFO). The unmasked and active interrupt status bits are then combined to report an interrupt at a configurable priority level. The input FIFOs 106 signal an interrupt when data is available. The output FIFOs 110 signal an interrupt when room is available. In some embodiments, for message fabric input and output FIFOs, the interrupt status is reported on a message basis (and for non-message fabric FIFOs, on single-word units).

CPU access to the FIFOs is uniform—POP (and PUSH) instructions take, for example, a 5-bit ID (for 32 input and 32 output FIFOs) indicating which one of the input (or output) FIFOs is to be popped from (or pushed into). The connection of the various ports on the non-CPU side of the FIFOs is configurable (e.g., via control/status registers (CSRs)) so that firmware can decide (independently for each CPU) how the input/output ports map to one or more input/output FIFOs. Non-CPU destinations that send responses, such as a core read DMA engine, a back-end read DMA engine, and some look-up engines also have control/status register (CSR) configuration so that the respective responses can be targeted to a firmware-selected CPU input FIFO.

In some embodiments, for each output FIFO 110, a CSR specifies the output port to which that FIFO is connected. For a non-message-fabric port, only a single output FIFO 110 can be connected to the port. For message fabric ports, any output FIFOs 110 mapped to a given port are served in the order in which they are granted by the message fabric. Each input FIFO 106 is configured to either be dedicated (and connected to a fixed input port), or to be driven from the message fabric (in which case the first word of the message specifies which input FIFO is to be used). A message arriving for a dedicated (non-message-fabric) port is an error. Similarly, if there are multiple message fabric input ports, it is an error if two of these ports target the same input FIFO 106 (as there is no way to handle contention across multiple input ports). In some embodiments, there may be multiple ports using the message fabric protocol if the message fabric itself is split into disparate pieces, or if other hardware units use the message fabric protocol to be able to send results to multiple FIFOs.

In various embodiments, the input FIFOs 106 provide a back pressure signal. The threshold for reporting back pressure must be CSR-programmable per input FIFO 106 (since FIFOs fed by the message fabric need to be able to store a full message, if not back pressuring, and since dedicated input ports may have different back pressure latencies). All back pressure signals are sent to a back pressure bus of the message fabric so that requests are only issued by a source if the requested destination (destination FIFO) has space. The configuration for the input FIFOs 106 connected to a fixed input port is also used to select the corresponding back pressure signal to be driven to that input port. Similarly, the output FIFOs 110 connected to a non-message-fabric (fixed) port respond to the back pressure input provided by that port. The output FIFOs 110 connected to a message fabric port select the respective back pressure signal based on the destination (e.g., to select one of the back pressure busses) and destination FIFO (e.g., to select a signal from the back pressure bus).

Figure 2:
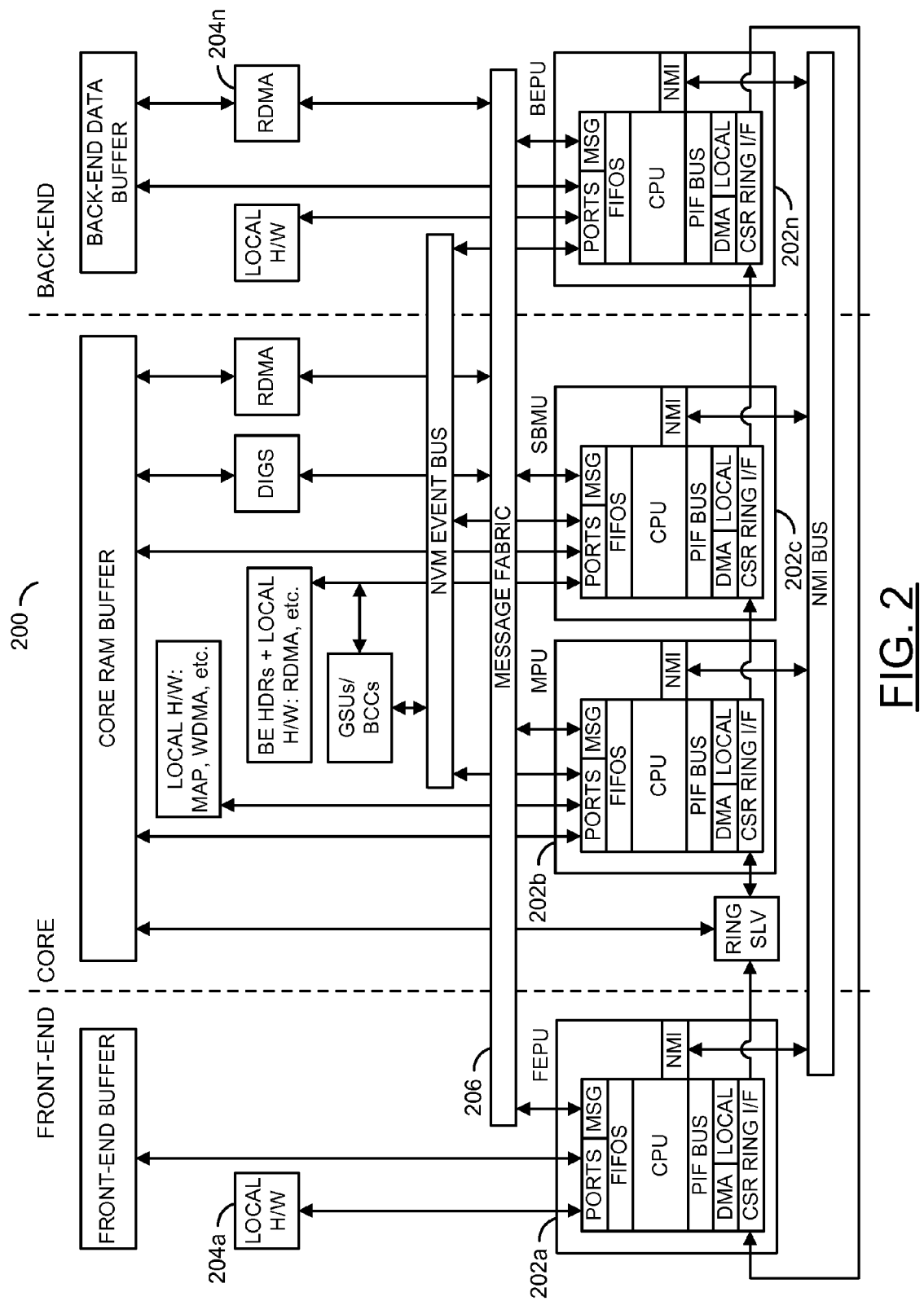
FIG. 2 is a block diagram illustrating a solid-state drive (SSD)/non-volatile memory controller having a variety of communication mechanisms including a message fabric in accordance with an embodiment of the invention.

Referring to FIG. 2, a block diagram of a circuit 200 is shown illustrating a portion of a solid-state drive (SSD)/non-volatile memory controller having a variety of communication mechanisms including a message fabric in accordance with an embodiment of the invention. In some embodiments, a plurality of processors 202a-202n and/or hardware units 204a-204n are coupled by the communication FIFOs via one or more shared and/or directly coupled connections. In further embodiments, the shared connections are communicatively coupled via a message fabric 206. According to various embodiments, the message fabric 206 comprises one or more of: a crossbar; a shared bus; a routed network; a switched network; a ring network; a star network; and any other communication medium.

In various embodiments, communication FIFOs are dedicated as point-to-point connections, such as when an output communication FIFO on a first processor is associated with an input communication FIFO on a second processor. Dedicating the communication FIFOs in this manner advantageously enables each output communication FIFO to receive a back pressure indication from a single input communication FIFO and enables a simpler implementation of a non-blocking message fabric. In other embodiments, such as where the message fabric 206 comprises a crossbar, the crossbar implements a non-blocking, message-based interconnection between input and output ports of the crossbar.

In various embodiments, a message fabric, such as a crossbar or other interconnection network, couples the processors 202a-202n and optionally and/or selectively one or more of a plurality of hardware units (e.g., direct memory access (DMA) engine, statistics management unit (SMU) engine, etc.) 204a-204n via a first subset of the communication FIFOs. Directly coupled connections connect the processors to at least some of the hardware units 204a-204n via a second subset of the communication FIFOs. The communication FIFOs support one or more types of traffic, such as messages and/or events and/or commands to or responses from the hardware units 204*a*-204*n*.

Messages are the basic unit of operation-specific communication between processors or other units in an architecture in accordance with an embodiment of the invention. The message-based communication in the architecture provides the necessary control to direct operations from initiation to conclusion, without causing undue overhead. For this reason, many messages from a requester are processed and forwarded one or more times without sending acknowledgments back immediately—the final unit to receive a forwarded message is the only one that need reply to the original requester.

In various embodiments, messages comprise one or more quantities of data, such as words (4 bytes) or doublewords (8 bytes). In some embodiments, a choice of a size of the quantity of data is an amount that an instruction of the instruction set of the processor is enabled to push into an output one of the communication FIFOs or pop from an input one of the communication FIFOs. For example, in some embodiments, the quantity of data is a doubleword (8 bytes), and a FIFO push instruction is enabled to push 8 B into a selected one of a plurality of output ones of the communication FIFOs. In further embodiments, such as a 32-bit processor, pushing or popping 8 bytes of data involves specifying two, 32-bit registers. In still further embodiments, a specification of one 32-bit register in a communication FIFO push or a communication FIFO pop instruction implicitly specifies a 32-bit register-pair, such as an even-odd pair.

In some embodiments, lighter-weight messages are termed events. Events are one quantity of data in size (e.g., one doubleword) and optionally and/or selectively have a simpler format than messages. For example, in various embodiments, events are used to communicate the occurrence of I/O activity to or from a non-volatile memory (NVM) from one processor and/or hardware unit to at least one other of the processors and/or hardware units. Each event comprises a location in the non-volatile memory that was accessed, and information about the access. According to various embodiments, the information about the access comprises one or more of: a type of the access, such as a read type, a write type, or an erase type; a total number of errors corrected during the access; a maximum number of errors corrected in any one of a plurality of error-correcting codewords during the access; and other information. In further embodiments, communication of the events enables managing statistics of the NVM. In some embodiments, events, such as NVM events, are sent via a separate message fabric and/or via separate direct couplings other than messages.

Figure 3:
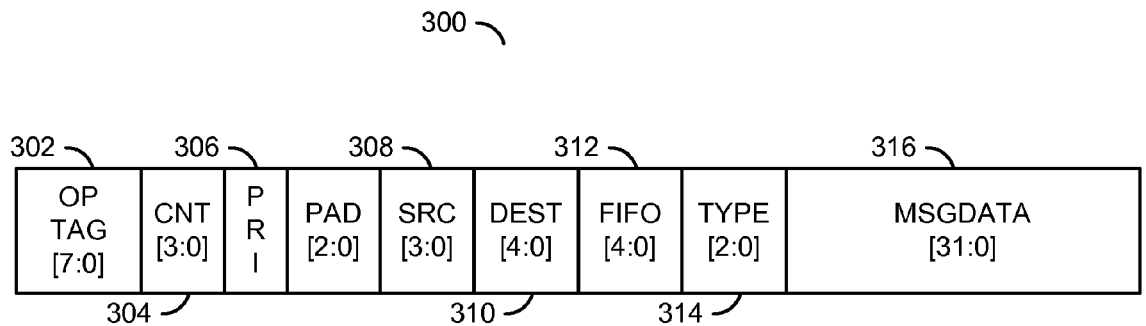
FIG. 3 is a diagram illustrating an example of a message header in accordance with an embodiment of the invention.

Referring to FIG. 3, a diagram is shown illustrating an example of a message header 300 in accordance with an embodiment of the invention. In some embodiments, messages are sent as a number of 64-bit words, with the first word (or header) specifying the message control and type information, as well as a count of the number of following 64-bit words in the message. In one example, the header 300 comprises an OpTag field 302, a count (CNT) field 304, a priority (PRI) field 306, a source field 308, a destination field 310, a FIFO field 312, a type field 314, and a message data field 316. According to various embodiments, the OpTag field 302 contains a specification of an operation tag; the count field 304 contains a specification of a count of a following number of quantities of data in the message; the priority field 306 contains a priority indication and/or level; the source field 308 contains a source specification; the destination field 310 contains a destination specification; the FIFO field 312 contains a specification of one of a plurality of receiving FIFOs at the destination; the type field 314 specifies a type of the message; the data field 316 contains a portion or all of data of the message. In some embodiments, the header may also comprise other information.

In some embodiments, the priority indication and/or level controls a priority of routing of the message through the message fabric. In some embodiments and/or usage scenarios, a destination FIFO of a message is implicit. In a first example, the message is sent on a directly coupled connection from a sending processor and/or hardware unit to a receiving processor and/or hardware unit, and there is solely one FIFO at the receiving processor and/or hardware unit. In a second example, a header of the message comprises a source and a destination field, and a destination FIFO, one of the communication FIFOs of a destination processor and/or hardware unit (e.g., specified by the destination field), is determined according to the source field. In other embodiments and/or usage scenarios, a destination FIFO of a message is specified in a header of the message.

The CNT (count) field 304 specifies how many quantities of data (e.g., doublewords) are in the message after the header (e.g., 0-15 more doublewords). The PRI field 306 specifies a priority of transmission of the message over the message fabric. The destination field 310 is used to route the message via the message fabric to a destination processor or hardware unit. The FIFO field 312 selects which one of a plurality of FIFOs at the destination is to receive the message. The operation tag (OpTag) field 302 associates the message with one of a plurality of operations that are being performed by the processors and/or hardware units. The OpTag field 302 enables coordination of work on the operations by associating each message with one of the operations. In some embodiments and/or usage scenarios, one or more of the operation tag values are reserved as "non-operation related" values used for management communications (and not specific to one of the operations). In various embodiments, some of the operation tag values are used for internal operations (as opposed to operations related to I/O commands from a Host). An example of an internal operation is a garbage collection (also termed "recycling") operation. In further embodiments, messages sent other than via the message fabric, such as via a directly coupled connection from one of the communication FIFOs of one of the processors to a hardware unit, use some or all of the message format, such as having a header and/or using the OpTag and/or FIFO fields.

In some embodiments, one or more of the hardware units are coupled to a particular one of the processors via a respective first one of the communication FIFOs of the processor for sending request messages to the hardware unit, and via a second one of the communication FIFOs of the processor for receiving response messages from the hardware unit. For example, in the case where the hardware unit is a DMA engine, the request message programs the DMA to perform an operation, and the corresponding response message indicates completion of the operation. In further embodiments, each of the request messages comprises a particular operation tag value and the corresponding response message comprises the same operation tag value (in order to associate the response with the corresponding request, and to advantageously enable out-of-order completion of the DMA operations). In still further embodiments, the DMA operation is programmed by the processor, and is then initiated in response to receipt of a "fetch" message with the particular operation tag value from another one of the processors.

In some embodiments, hardware units are optionally and/or selectively coupled to the message fabric. For example, in some usage scenarios, a hardware unit is directly coupled to a first processor via an input communication FIFO and an output communication FIFO of the first processor, and is also coupled to a second processor or to another hardware unit via the message fabric. The first processor is enabled to program the hardware unit to perform an operation via the output communication FIFO and to receive status of the operation via the input communication FIFO, and the second processor or the other hardware unit is enabled to initiate the operation via the message fabric. In further embodiments, the messages sent to the hardware unit comprise a header with the OpTag field so that multiple operations are enabled to be programmed (e.g., each with a different operation tag value), and the second processor or the other hardware unit is enabled to initiate a desired one of the operations by providing the corresponding operation tag in a "fetch" message sent via the message fabric.

In one example usage scenario, a map assist hardware unit is directly coupled to an input one and an output one of a plurality of communication FIFOs of a processor. The processor is enabled to send messages to the map assist hardware unit via the output communication FIFO and to receive responses from the map assist hardware unit via the input communication FIFO. The map assist hardware unit is enabled to receive the messages, process information of the message to perform a map lookup, and to return a response to the processor via the input communication FIFO.

In another example usage scenario, a debug assist hardware unit is coupled via a message fabric to two or more processors via respective output communication FIFOs of the processors. Messages received from the debug assist hardware unit are optionally and/or selectively time stamped, and are stored in one or more circular FIFOs to maintain a log of information in the event of a failure. The processors send messages to the debug assist hardware unit according to a debug level and/or other decisions. In further embodiments, the one or more circular FIFOs are periodically dumped via a debug interface to provide a continuing log of operations.

In some embodiments, the communication FIFOs of a processor are enabled to interrupt the processor in response to one or more conditions. According to various embodiments, the conditions include one or more of: an input communication FIFO has received a quantity of data; an input communication FIFO has received a determined threshold number of quantities of data; an input communication FIFO has received a message; an input communication FIFO has received a determined threshold number of messages; an output communication FIFO has room for a quantity of data; an output communication FIFO has room for a determined threshold number of quantities of data; an output communication FIFO has room for a message; an output communication FIFO has room for a determined threshold number of messages; and other conditions.

In further embodiments, each of the interrupts is at a selectable one of a plurality of interrupt levels. For example, each of the communication FIFOs is associated with a respective Control/Status Register specifying an interrupt level from, for example, 2 through 7. In some embodiments, status of the interrupts is presented to the processor in a form of a mask. The mask may be implemented comprising a respective bit for each of the FIFOs indicating if the corresponding FIFO is generating an interrupt. For example, the interrupt status is presented as one or more Control/Status Registers. In various embodiments, each of the interrupts is maskable, such as by one or more Control/Status Registers with one bit for each of the communication FIFOs. The interrupt status is readable, but only ones of the interrupts that are not masked are enabled to interrupt the processor.

In some embodiments, the communication FIFOs of one or more of the processors are implemented using one of more shared random access memories (RAMs) of the processors. Implementation of the FIFOs using shared RAM of the processor enables a size of each of the communication FIFOs to be statically and/or dynamically controlled. In further embodiments, one shared RAM is used for input ones of the communication FIFOs, and a second shared RAM is used for output ones of the communication FIFOs. Firmware running on the processor is enabled to partition the shared RAMs to assign a specified respective maximum size for each of the input communication FIFOs and output communication FIFOs. In further embodiments, a granularity of the respective maximum size is one or more quantities of data (e.g., one or more doublewords). For example, in some implementations and/or usage scenarios, the quantity of data is a doubleword (8 bytes), the granularity is 8 doublewords, the shared RAM for the input communication FIFOs is 16 KB, the shared RAM for the output communication FIFOs is 8 KB, and there are 32 each of the input communication FIFOs and the output communication FIFOs.

In some embodiments, the data in the communication FIFOs, such as messages, is protected by an Error-Correcting Code (ECC). When data is pushed into an output communication FIFO by the processor, the ECC is added, and when data is popped from an input communication FIFO by the processor, the ECC is checked (and optionally and/or selectively detected errors are corrected).

In various embodiments, there may be one or more message fabrics or other shared (vs. direct) couplings among the communication FIFOs on different processors. In a first example, two processors that communicate frequently use a directly coupled connection. In a second example, there is a plurality of message fabrics coupling different subsets of the processors (as determined by the usage scenario). In a third example, there is a plurality of message fabrics, each message fabric for sending a different type and/or a different priority of messages. Different processor architectures may have different instruction formats and/or capabilities, and accordingly the FIFO manipulation (e.g., push, pop, status, etc.) instructions differ according to the processor architecture.

In some implementations, the FIFOs are incorporated into a tightly-coupled memory attached to the processor, and the FIFOs are accessed in a memory-mapped fashion. For example, after configuring the FIFOs, store instructions addressing a particular address-mapped portion of the tightly-coupled memory are "mapped" to address a portion of the tightly-coupled memory in a FIFO fashion (without the processor needing to manage the FIFO head and tail pointers). The tightly-coupled memory is also accessible by one or more external agents to provide access to the FIFOs stored therein to other processors and/or hardware units.

Hardware may parse some of the fields in the first word of a message for purposes such as routing or queuing messages, or to activate hardware operations such as the Core Read DMA and the Back-End Read DMA. In some cases, hardware operations may require multi-word messages. Some messages need multiple words to transmit all of their data. The "CNT" (count) field in the first word (header) of the message indicates the number of words in the message. The format of any subsequent words after the first word is message type dependent. For example, a read operation from the Core to the Back-End may need to specify multiple E-page address/length groups in order to provide the required NVM accesses for a Front-End read request that spans multiple compression units. The auxiliary count field has a value from 0 to 15 to indicate the number of following words after the first word. In general, the total length of the message in words is one more than the value of the auxiliary count field.

Messages include a source field and a destination field. Every processor as well as certain units, such as the Back-End Read DMA, has a unique source/destination number. For example:

| Unit | Source/Destination Number |
|---|---|
| (reserved) | 0 |
| Front-End Processing Unit (FEPU) | 1 |
| Map Processing Unit (MPU) | 2 |
| Statistics/Background/Management Unit (SBMU) | 3 |
| Back-End Processing Unit (BEPU) | 4 |
| Core Read DMA | 8 |
| Back-End Read DMA | 12 |
| Debug Info Gathering | 15 |

Processors are responsible for allocating operation tags for request messages, placing the allocated operation tags in the request messages, and performing initial processing of the request messages. The processors are thus also responsible for certain tag management requests (e.g., de-allocation). The source field in messages is needed so that the recipient of a message knows where to send a response. For example, the source field in a request would nominally become the destination field in a response. The source field is also useful as a debugging aid, particularly for messages echoed for debugging. The source field, however, does not have to be the same as the last sender of a message. Consider the case of the management processing unit (MPU) forwarding a read request, after a map look-up, to the back-end processing unit (BEPU) on behalf of the front-end processing unit (FEPU). The source field should still refer to the FEPU because the response from the BEPU needs to go there.

The "FIFO" field 312 indicates which one of multiple FIFOs at the destination is to receive the message. Including the destination FIFO in the first word of the message enables easier routing of messages (e.g., through simpler, per-message control of back pressure). Some destinations may only implement a limited number (possibly just one) FIFO. Destinations, such as CPUs, may have a configurable number of FIFOs. Non-existent or disabled FIFOs always assert back pressure, so that any message directed to such a FIFO will be blocked (and will stall at the sender).

The OpTag field 302 includes an operation tag associated with a message. Messages are generally associated with operations, and operations are assigned a unique operation tag so that messages can refer to the operation with which they are associated. Including the operation tag in messages enables senders and receivers to refer to data structures associated with operations in a very compact form—by referencing the operation tag, all the state of the operation is potentially accessible.

In some embodiments, the "priority" ("PRI") bit 306 allows two priorities of messages. Having two priorities prevents head-of-line blocking when "bulk" messages used for data transfer are backed up. This allows high priority messages to have a separate path (e.g., separate FIFOs) that is not blocked by non-priority messages.

The "type" field 314 indicates the type of the message. Specifics of the message format may vary based on the message type. Except for a few messages that are interpreted by hardware, the message type is only used in inter-processor communication, and thus the assignment of types to meanings is (for the most part) under firmware control. For example, the Back-End Read DMA and the Core Read DMA interpret certain types of messages.

The 32-bit "message data" field 316 allows many types of message to only require a single word, as the message data field is large enough to encode a Host Page address or an Epage address.

In some embodiments, processors are responsible for allocating operation tags. For message flows with a "global" state, such as a Host read, a Host write, or a recycle operation, the initiating processor (e.g., the FEPU for Host operations or the SBMU for recycle operations) would generally assign an operation tag to the initial request message that starts the flow, and all subsequent messages related to that flow would generally use the same operation tag. This is necessary for certain parts of the flows. For example, read DMAs are programmed to respond to a given operation tag and produce certain data. Firmware may be configured to use an orthogonal set of operations tags to program the DMAs, and notify other processors needing to interact with the DMAs what those orthogonal operation tags are, but that is extra work for no gain.

In some embodiments, processors are also responsible for de-allocating operation tags. Generally, when operations are complete, some type of "done" message may need to be sent so that other processors with per-operation-tag state know that state can also be de-allocated. The operation tag of zero is reserved for non-operation-specific messages—communications that are not associated with data movement and which do not require a response.

Figure 4:
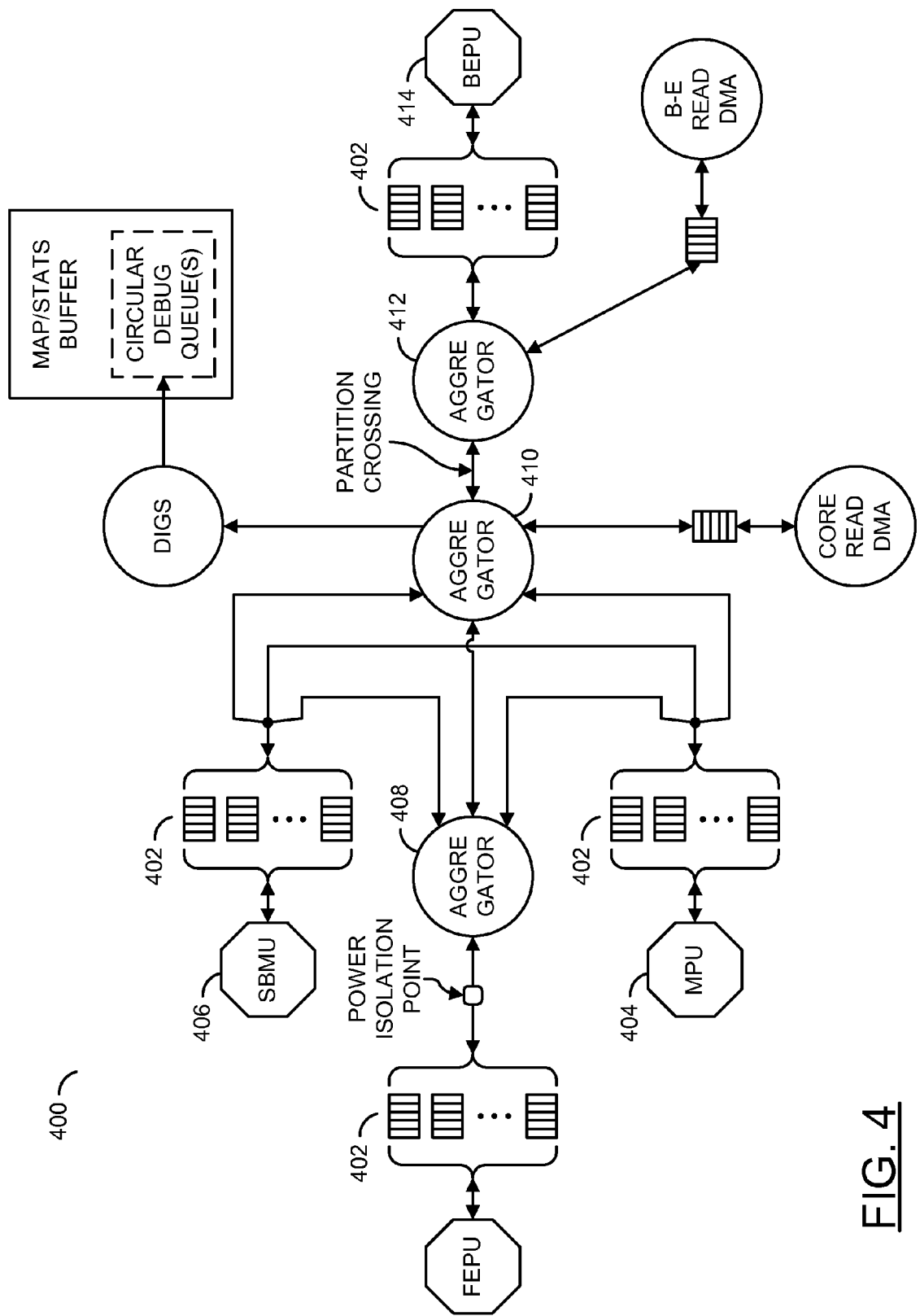
FIG. 4 is a diagram illustrating a conceptual view of a message fabric in accordance with an embodiment of the invention.

Referring to FIG. 4, a diagram is shown illustrating a conceptual view of a message fabric 400 in accordance with an embodiment of the invention. Messages are forwarded between processors over a message fabric. Each processor has one or more message FIFOs 402, depending on the required connectivity. The MPU 404 and SBMU 406, for example, in some implementations, have a dedicated connection to each other, and each has a dedicated connection to aggregators serving the Front-End (e.g., aggregator 408) and the Back-End (e.g., aggregator 410). In other implementations, one or more non-blocking crossbars (or some other non-blocking fabric) are used to provide the effect of dedicated connections without as much wiring. For example, in some embodiments, aggregators are used to limit wiring across partitions (e.g., aggregators 410 and 412). Each aggregator acts similarly to an n-to-1, non-blocking crossbar to provide a single cross-partition connection.

Messages contain a FIFO field indicating where at the respective destination the message should be queued (e.g., at which destination FIFO). The FIFO field also controls back pressure for the sender of the message—a sender can only send a message through the fabric if the receiver is not back pressuring the selected FIFO from the destination. The assignment of sending and receiving FIFOs at the sources/destinations is up to firmware. Effectively, this enables firmware to construct respective Virtual Output Queues (VOQs). Multiple FIFOs can be used between a sender and a receiver, or a single FIFO, depending on firmware needs for traffic segregation. For example, the BEPU 414 could have separate FIFOs for receiving map read messages vs. map write messages vs. data read messages vs. data write messages, if firmware so desired. The PRI bit in message headers is used to ensure faster arbitration through the message fabric, but does not enter into the routing or destination selection. Firmware can dedicate certain FIFOs at a destination to receive priority traffic, or firmware can put priority traffic in the same destination FIFO as other traffic, as it chooses.

In some embodiments, the source and destinations follow a "single destination FIFO rule. A given source FIFO at a message source is only allowed to communicate to one destination FIFO at a single destination. This rule greatly simplifies the message fabric since message fabric arbitration does not have to be fully general. In particular, there are no cases where two sources compete for a single destination FIFO. (Handling competition for destination FIFOs that can back pressure is much more complex when also requiring that the message fabric be non-blocking.)

Referring to FIG. 5, a diagram is shown illustrating an example method 500 for handling message fabric arbitration and back pressure. Back pressure from the message destinations is distributed over back pressure busses from each destination to each possible source. For example, with 32 destination FIFOs at a given destination, a five-bit back pressure bus (e.g., one framing bit and four data bits) from a given destination could distribute complete back pressure information for each FIFO in that destination every eight cycles. Using the back pressure busses, the sources are able, at each source FIFO, to mask their requests based on the presence/absence of back pressure from the corresponding destination FIFO. In this manner, the message fabric arbitration can ignore back pressure since any request is assured to have adequate space at its destination FIFO. Further, the message fabric arbitration can even ignore specifics of source and destination FIFOs (and simply serve the various sources fairly), since any request is assured to be non-blocking. Communicating back pressure over multiple cycles, as well as arbitration delays, relies on adequate hysteresis in the destination FIFOs to account for requests and/or messages already in flight when back pressure is asserted.

Figure 6:
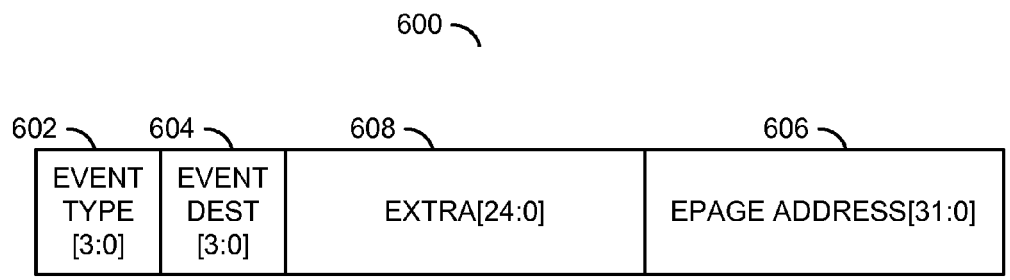
FIG. 6 is a diagram illustrating an example of a non-volatile memory (NVM) event format in accordance with an embodiment of the invention.

Referring to FIG. 6, a diagram is shown illustrating an example of a non-volatile memory (NVM) event format 600 in accordance with an embodiment of the invention. NVM events are sent as a single 64-bit word that specifies all the information needed to interpret the event. NVM events are used for non-operation-specific status communication. The primary use of NVM events is for the Back-End (or another processor) to notify the Statistics Management Unit (SMU) about NVM usage, such as reading a NVM location or erasing a NVM block. Based on the NVM events received, the SMU updates one or more statistics data structures (such as RUS, RDC, BES, etc.) that the SMU maintains.

NVM events include a "type" field 602 indicating the type of the event. A type of zero is reserved as a no-op (ignored) NVM event. The interpretation of other types is firmware dependent—the BEPU (or another processor) is responsible for generating NVM events, and the interpretation of NVM events is by the SMU which is programmed to respond to various types of NVM events. Types may include NVM operations such as read, write, or erase.

NVM events optionally include a destination field 604, depending on the type of the NVM event. The destination field 604 may be used so that the NVM event is only applied to particular data structures. If used, a destination field of zero is global and applies to all data structures. NVM events include an "E-page Address" field 606 indicating the affected portion of NVM. The E-page address is generally a virtual address (prior to bad-block re-mapping). As with the event type, the E-page address is processed by the SMU in a very flexible fashion. For example, the SMU is able to respond to and filter NVM events when a sub-field of the E-page address is within a certain range, or when a portion of the E-page address is valid in a per-statistics bit-map. This enables the SMU to compute such statistics as: Read Disturb Counts—tracked on NVM location reads; Program/Erase Counts—tracked on erasing the last block in an R-block; R-block Used Space—tracked on an R-block basis; ECC decoding error statistics—tracked on a firmware-configurable basis.

In some embodiments, at least one type of NVM event is generated by the Map Processing Unit (MPU)—updates to the R-block Used Space when data is written. This includes decrementing the used space in the previous R-block (where the overwritten data is), and incrementing the used space in the new R-block (where the new data is being written). The R-block used space, however, may also be updated by the BEPU—the erase of the first block in an R-block can be used to clear the R-block free space for that R-block. NVM events include an "extra" field 608 for additional information. For example, for ECC decoding error statistics, the extra field 608 is used to encode a number of errors corrected. As a special case, an "Epoch update" NVM event type uses all 56 bits provided by the padding, extra, and Epage address fields to specify a 56-bit Epoch value.

Figure 7:
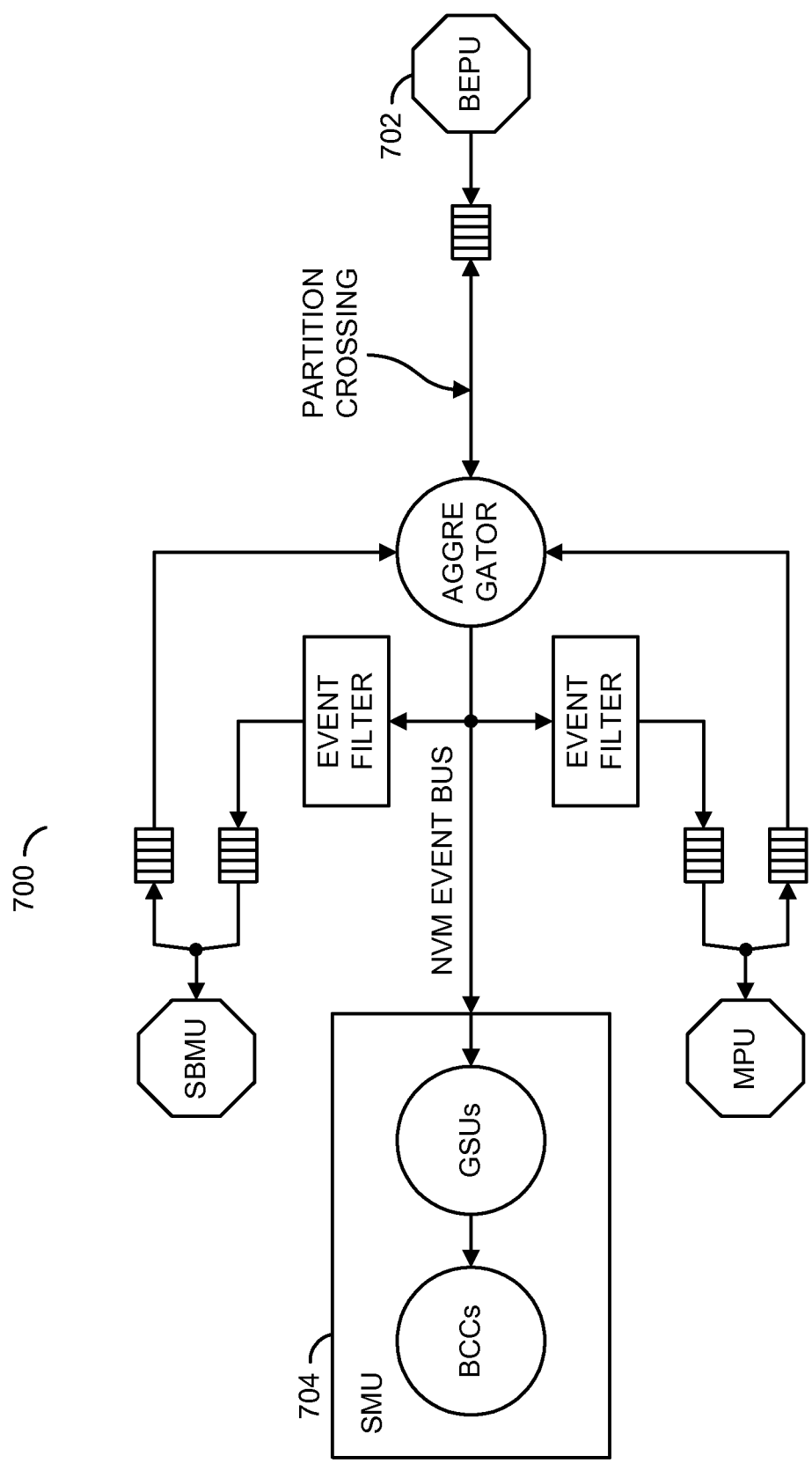
FIG. 7 is a diagram illustrating a conceptual overview of a NVM Event Fabric in accordance with an embodiment of the invention.

Referring to FIG. 7, a diagram is shown illustrating a conceptual overview of a NVM Event Fabric 700 in accordance with an embodiment of the invention. In various embodiments, NVM events are sent from processors over the NVM event fabric 700. The NVM event fabric 700 is similar to the message fabric 400 shown in FIG. 4. One or more of the processors, excluding the Front-End Processing Unit (FEPU), are sources of NVM events, with the Back-End Processing Unit (BEPU) 702, which manages the NVM, being the primary source of events related directly to NVM operation. The SMU 704 is the primary sink for NVM events, though at least one of the processors (e.g., via an Event Filter) is also a sink (e.g., in case it is necessary to have higher-level processing of any of the NVM events, beyond what the SMU 704 can do).

In various embodiments, general purpose CPUs, the FEPU, MPU, SBMU, and BEPU, communicate with many of the hardware modules within the respective partitions through dedicated hardware control interface ports each of which is assigned to a specific CPU communications FIFO. The interface passes 64-bit doublewords from the CPU to the hardware module or vice versa. These are generally requests from the CPU for some type of hardware assist and data or status responses from the hardware module back to the CPU. The exact contents of the data transmission depends on the hardware module in question, but they have the general form of a header doubleword identifying the type of operation, possibly followed by one or more additional doublewords. The different request and response formats are used for functions such as: MPU requests for host page mapping from, for example, a map hardware assist logic and the hardware response with the result of the map lookup; CPU fast memory access requests to the PUBA hardware and the PUBA responses to the CPU; and CPU programming of local DMA engines and the hardware status responses.

Though the contents of the messages is different for each hardware module, the interface definition and protocol for flow control, data bus, and sideband control signals is the same for all instances and is used for responses from the hardware to the CPU FIFOs as well as from the FIFOs to the hardware. The only exception to this is the HCP connections to the PUBA. The flow of data is controlled through a valid-ready handshake, similar to the protocol of the message fabric router (MFR) interface.

The message fabric provides a generalized communication path between the CPUs and between the CPUs and specific hardware components in different hardware partitions. Communications between the CPUs and hardware components in the same partition are handled through direct connections between the CPU FIFO queues and FIFOs in the hardware components. Each of the various CPUs (e.g., FEPU, MPU, SBMU, BEPU, etc.) is capable of sending messages to and receiving messages from any of the CPUs, including sending messages to its own receiving FIFOs. In addition all of the CPUs may send messages to a debug information gathering site (DIGS). The DIGS implements a number of receiving FIFOs, one for each CPU. Communication to the CRDMA and BERDMA over the message fabric is limited. The FEPU is not permitted to send messages directly to either of these hardware units. Since they are both in the Core Partition, the MPU has a direct a Hardware Control. Port (HCP) FIFO connection to the CRDMA for programming DMA operations, so no Message Fabric FIFO is implemented in the CRDMA for the MPU. The BEPU sends DMA start messages to the CRDMA across the partition boundary. These request messages are transmitted across the message fabric. Similarly, the back-end read direct memory access engine (BERDMA) does not implement a message fabric FIFO for the BEPU, since there is a direct hardware FIFO connection with the BEPU within the back-end (BE) Partition. The MPU and front-end host write DMA (FEHTxDMA) sends DMA start messages to the BERDMA, so message fabric facilities are implemented for these connections. The CRDMA and BERDMA still implement input FIFOs for communications from their local CPUs, but these FIFOs are directly connected to Hardware Control Port output FIFOs in the CPU. The data transmission to the HCP FIFOs does not participate in the message arbitration or back pressure routing, reducing message fabric bandwidth requirements and reducing the latency of these direct transmissions.

In various embodiments, each outbound FIFO can be configured to transmit messages to a single inbound FIFO in a receiving unit, creating a virtual channel between these queues. In some embodiments, this mapping is configured by firmware programming a set of message fabric (MF) map control/status registers (CSRs). The outbound FIFO logic for each CPU includes a control register for each Outbound FIFO identifying whether that FIFO is part of a message fabric virtual channel and, if so, what destination and FIFO are the target. When firmware pushes a message into an outbound FIFO, the hardware uses this CSR map to route the message to the correct destination FIFO. The message fabric provides a common physical transport mechanism for all of these virtual channels. If the destination of any one virtual channel is busy and cannot accept messages, this must not be allowed to block the other virtual channels across the fabric. To prevent the message fabric output of a CPU from being blocked, the outbound FIFO must only present a message to the interface if the target inbound FIFO can accept the message. This means that each outbound message fabric FIFO must receive a back pressure signal from the configured target FIFO to indicate when the target is busy. These busy, back pressure signals are routed from the target FIFOs to the appropriate source FIFO through a central Message Fabric Back Pressure Bus (BPB). A copy of the message fabric map CSRs is maintained in the BPB in order to route the FIFO busy signals from each target back to correct source FIFO of that virtual channel. Because customer written firmware may be run on the FEPU, communication from the FEPU over the message fabric must be limited to specific destinations. The message fabric map CSRs are not addressable by firmware running on the FEPU. Since the messages are routed based on the message fabric map, firmware on the FEPU is only able to communicate through the allowed channels.

The CSR routing map in the CPU outbound FIFO logic and in the BPB is written by firmware during the boot process. The CPU CSRs are implemented in register files that cannot be initialized by the hardware at reset. Firmware initializes the tables before the message fabric can be used. The DIGS, CRDMA, and BERDMA do not transmit messages. They only act as receivers on the message fabric.

In various embodiments, the message fabric is composed of two layers: Back Pressure Bus (BPB) and the central Message Fabric Arbiter (MFA). The Back Pressure Bus communicates the status of the receiving inbound FIFOs back to the source outbound FIFOs. FIFO busy signals are received by the BPB from each receiving FIFO of each destination. The message fabric map CSRs in the BPB identify the destination FIFO for each source FIFO. This configuration information is used to route a specific destination FIFO busy signal to each source FIFO.

In the message source, the logic for each outbound FIFO with active requests ready to transmit checks the respective back pressure input from the configured target FIFO. If the target FIFO is available, the outbound FIFO logic will request use of the outbound message port. If not, the outbound FIFO will hold the message pending until the target FIFO busy signal is de-asserted.

Each CPU contains an arbiter that can select the next message to transmit from among the outbound FIFOs presenting valid requests. Two levels of priority for messages are available (e.g., controlled by the PRI bit in the message header). Messages with PRI=1 are considered high priority requests and should be selected for transmissions before low priority messages not having this bit set in the message header. The outbound message port of each CPU uses a 2-level round-robin arbitration scheme to meet this requirement.

Messages are defined as a sequence of one to 16 64-bit doubleword values. The majority of messages are expected to be four 64-bit values. The message fabric hardware time multiplexes each 64-bit value over a 16-bit data bus in four cycles. This provides a raw bandwidth of 25 M length four messages per second at 400 MHz cycle time. In the worst case of a fully saturated system, arbitration delays could limit a single CPU to 5 M messages. The MPU may require 5-6 messages per IOP, or 2 M-2.4 M messages for 400 k IOPs. The time multiplexed bus should be adequate to maintain these performance levels.

Messages are transmitted from each source to the message fabric router (MFR) using a Valid-Ready handshake on a cycle-by-cycle basis. For each cycle of a message, the source asserts a valid signal, destination ID, and target FIFO ID along with the time multiplexed portion of the message data, parity and check bits, and sideband control signals used by the destination. If the MFR input buffers can accept this cycle, the MFR asserts a ready signal. When both valid and ready are asserted in the same cycle, the data is transmitted. The MFR input buffer captures the request to present for arbitration and the source is free to present new data. Both valid and ready are level signals. Valid may be asserted when the MFR is not ready and the MFR may assert ready even if no valid request is being presented. A source is not required to transmit all cycles of a complete message consecutively, but must transmit all four cycles of a complete 64-bit doubleword sequentially. The CPU interface to the MFR assumes that it will receive the 4 cycles of a specific doubleword before receiving data from any other doubleword.

In some embodiments, the message fabric back pressure bus and message fabric arbiter are both centralized functions. The central collection and distribution points for these structures are implemented in the Core Partition. The front-end (FE) includes two message sources, the FEPU and the FEHTxDMA, both of which can transmit messages over the fabric. In order to minimize the cross-partition interface, the FE partition implements an aggregator function that arbitrates between the FEPU and FEHTxDMA requests and presents a single request and data transmission interface to the fabric logic in the Core. The FEHTxDMA does not receive messages over the fabric, so only a single data receive interface is required from the Core to the FE. In the BE partition, only the BEPU transmits messages over the fabric, so an aggregator is not required on the request and data transmission interface from the BE to the Core. However, the BER-DMA as well as the BEPU receive messages over the fabric. A single interface transmits data from the Core to the BE, so the BE must implement logic to route incoming messages to the correct destination. An implication of these structures is that messages transmitted from the FE or to the BE may incur more cycles of latency than messages within the Core, depending on the detailed implementation and timing requirements.

The back pressure bus is able to route the full or busy indication from any receiver target FIFO to any source FIFO, depending on the configuration set in the CSRs. This implies that the FIFO full indications from each FE or BE destination is presented to the BPB without aggregation, and back pressure to the FE or BE requesters is transmitted with no de-MUX routing.

In some embodiments, the FIFO communications buffers are implemented as two sub-modules, an outbound FIFOs sub-module and an inbound FIFOs sub-module. The outbound FIFOs sub-module implements a set of 32 FIFOs for communications from the CPU to external hardware through Hardware Control Ports or the Message Fabric Port. Firmware running on the CPU pushes 8-byte values into the Outbound FIFOs using TIE instructions. Hardware state machines pop data from the FIFOs and steer it to the appropriate output port. To reduce the area cost of these FIFOs, the data, pointers, and status of all 32 FIFOs are maintained in shared register files and RAMS. To perform either a read or write, the pointer RAM is first read to obtain the location of the specific FIFO entry to be read or written and then the data can be read or written in the data register file. The pointer and FIFO status, such as entry count and message count, must be updated also. This is performed in a pipeline that can accept a new read (pop) or write (push) every cycle. The pipeline detects back-to-back operations to the same FIFO and bypasses the updated pointer and status values from the older pipeline operation to the younger. Separate control logic for each FIFO attempts to read data for that FIFO when a message is available and buffer space is available in the output port logic. In some embodiments, a round-robin arbiter with two priority levels selects one of active read requests present to the pipeline every cycle. The FIFO hardware cannot stall the CPU, so CPU push requests need to take priority over hardware pop requests.

Each of the Outbound FIFO read state machines is configured to drive either a destination on the Message Fabric through the Message Fabric output port or a specific hardware module through a Hardware Control Port. All CPUs must have a Message Fabric Port, so this logic is included in the CPU Sub-System Hard Macro. Each CPU has a unique number of HCPs depending on what hardware modules are connected in that CPU's partition. The HCPs are instantiated in a soft macro for each CPU and assigned a unique HCP id. This HCP id is assigned to a specific FIFO through CSRs in the controller for that FIFO. The HCP id is passed from the read pipeline to the CPU Sub-System Soft Macro where it is decoded to steer the data from the read pipeline to the appropriate output port.

The output ports receive 8-byte (64-bit) values read from the FIFO and output these as 2-byte (16-bit) values over 4 cycles. The output ports observe the MF or CPU HCP bus protocol, controlling cycle by cycle transfer of each 16 b value. Each output port maintains a pair of 64b output buffers. The second buffer can be loaded with data from the read pipeline while data is MUXed from the other buffer for transfer. This covers the arbitration and read pipeline delays, allowing data to be streamed continuously for a given FIFO in most cases.

The inbound FIFOs sub-module implements a set of 32 FIFOs for communications from external hardware through Hardware Control Ports (HCPs) or the Message Fabric Port to the CPU. The MF Port and HCPs collect input messages and push each 8-byte doubleword into a FIFO that is addressed by the MF message or configured as the destination of the HCP. Interrupts are generated when complete messages are available in a given FIFO and Firmware running on the CPU then pops 8-byte values from the FIFOs using TIE instructions. To reduce the area cost of these FIFOs, the data, pointers, and status of all 32 FIFOs are maintained in shared register files and RAMS. Independent read and write ports are provided, so a read (pop) and write (push) may occur simultaneously. To perform either a read or write, the pointer RAM must first be read to obtain the location of the specific FIFO entry to be read or written and then the data can be read or written in the data register file. The pointer and FIFO status, such as entry count and message count, must be updated also. This is performed in independent read and write pipelines. Since both a read and a write of the pointers and status is needed, each pipeline can perform a new operation every 2 cycles except in special cases. The CPU TIE lookup interface is the only source of read requests into the pipeline. A round-robin arbiter with two priority levels selects which input port is allowed into the write pipeline every cycle.

In some embodiments, all CPUs have a message fabric port, so this logic is included in the CPU Sub-System Hard Macro. Each CPU has a unique number of HCPs depending on what hardware modules are connected in the partition of the CPU. The HCPs are instantiated in a soft macro for each CPU to allow this customization. The MFR and HCP input ports collect a 64b doubleword of a message over 4 cycles on a 16b data bus, with the exception of HCPs connected to a PUBA. The PUBA uses a special HCP interface that transmits the full 64-bit data bus in parallel with. All CPU instances have at least one PUBA interface, implemented as HCP0. If additional 64-bit HCP interfaces are needed, they are instantiated as the next sequential HCP. For example the FEPU has two PUBA interfaces using HCP0 and HCP1.

When a full 64 b doubleword has been collected, the input port logic for that interface presents an ID FIFO write (push) request. Arbitration for access to the IB FIFO write pipeline is performed in 2 levels. A round robin arbiter selects from all valid HCP requests. This request is presented to the final arbiter which selects between the HCP request and any valid MFR request, also in a round robin fashion. Each cycle of data received over the Message Fabric includes sideband information that identifies the target FIFO of the message. Each HCP must be configured through CSRs with the IB FIFO number associated with that interface. The FIFO number is passed with the request to the ID FIFO write pipeline.

In some embodiments, the processor 100 sees a pool of input FIFOs 106 implemented in an input FIFO RAM 108 and a pool of output FIFOs 110 implemented in an output FIFO RAM 112. In some embodiments, the pool of input FIFOs 106 and the pool of output FIFOs 110 each comprise 32 FIFOs that can individually be configured in size, and that can individually be configured to receive (for input FIFOs) or send (for output FIFOs) to a number of different types of ports (e.g., message fabric, PUBA, NVM event bus, header extract, DMA and other status, H/W units, etc.). Non-message fabric ports are assumed to be single-word-at-a-time, and are also presumed to be (effectively) point to-point with a simple back pressure protocol (where a receiving FIFO supplies a back pressure output, and a corresponding sending FIFO responds to a back pressure input). Message fabric ports are the only ports supporting multi-cycle communications.

Figure 8:
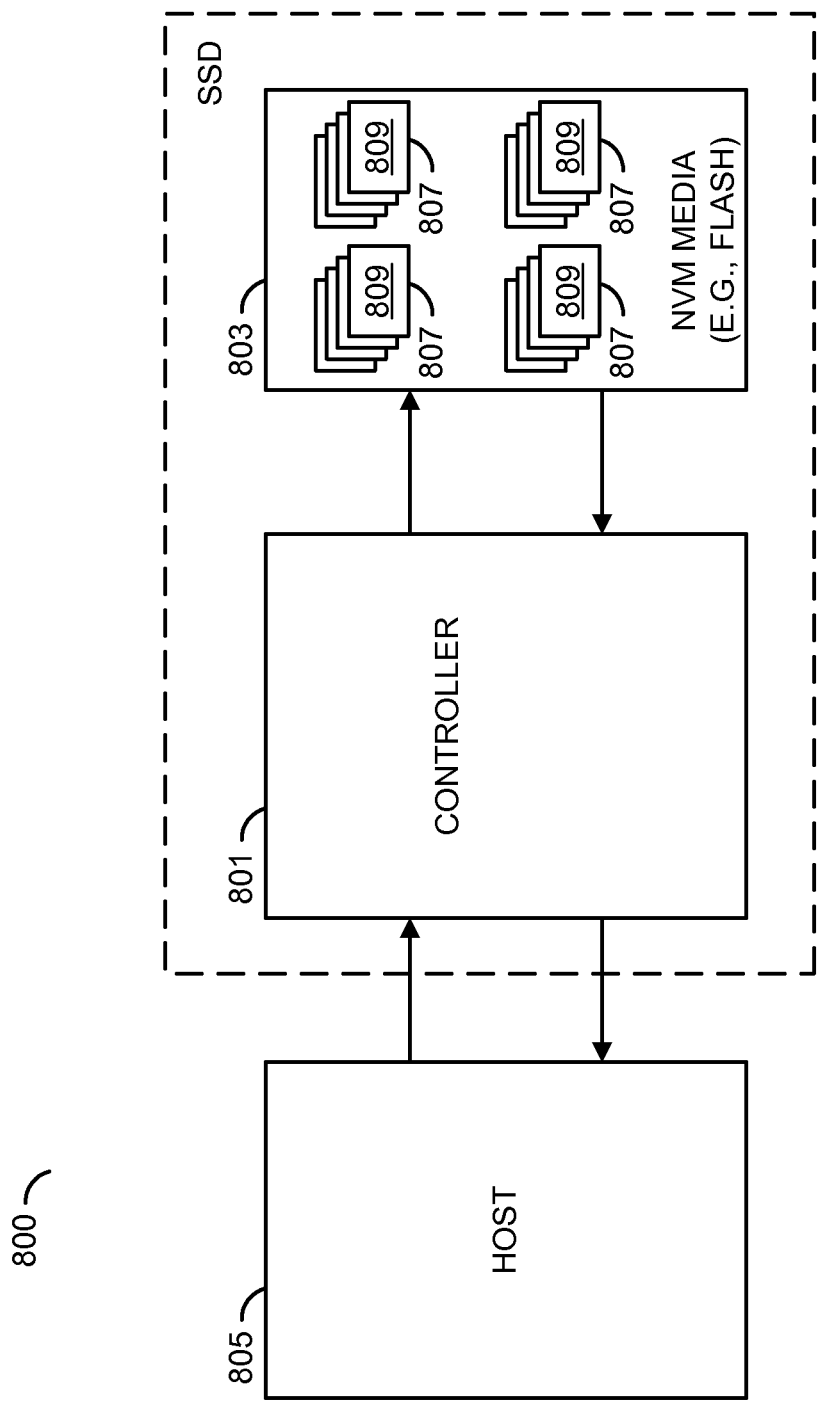
FIG. 8 is a diagram illustrating a non-volatile memory system in accordance with an embodiment of the invention.

Referring to FIG. 8, a diagram is shown illustrating a non-volatile memory system 800 in accordance with an embodiment of the invention. In various embodiments, the non-volatile memory system 800 comprises a block 801, a block 803, and a block 805. The block 801 comprises a memory controller implementing unified message-based communications in accordance with an embodiment of the invention. The block 803 comprises a non-volatile memory (NVM) media. The block 805 comprises a host.

The controller 801 may be configured to control one or more individual non-volatile memory channels (or lanes). In some embodiments, the controller 801 may implement multiple memory channel controller instances to control a plurality of non-volatile memory channels. The controller 801 has a non-volatile memory interface configured to couple the controller 801 to the non-volatile memory media 803. The non-volatile memory media 803 may comprises one or more non-volatile memory devices 807. The non-volatile memory devices 807 have, in some embodiments, one or more non-volatile memory die 809. According to a type of a particular one of the non-volatile memory devices 807, a plurality of non-volatile memory die 809 in the particular non-volatile memory device 807 are optionally and/or selectively accessible in parallel. The non-volatile memory devices 807 are generally representative of one type of storage device enabled to communicatively couple to controller 801. However, in various embodiments, any type of storage device is usable, such as SLC (single level cell) NAND flash memory, MLC (multi-level cell) NAND flash memory, TLC (triple level cell) NAND flash memory, NOR flash memory, read-only memory (ROM), static random access memory (SRAM), dynamic random access memory (DRAM), magneto-resistive random-access memory (MRAM), ferromagnetic memory (e.g., FeRAM, F-RAM FRAM, etc.), phase-change memory (e.g., PRAM, PCRAM, etc.), racetrack memory (or domain-wall memory (DWM)), resistive random-access memory (RRAM or ReRAM), or any other type of memory device or storage medium.

In some embodiments, the controller 801 and the non-volatile memory media 803 are implemented on separate integrated circuits. When the controller 801 and the non-volatile memory media 803 are implemented as separate integrated circuits (or devices), the non-volatile memory interface of the controller 801 is generally enabled to manage a plurality of data input/output (I/O) pins and a plurality of control I/O pins. The data I/O pins and the control I/O pins may be configured to connect the device containing the controller 801 to the external devices forming the non-volatile memory media 803. In various embodiments, the controller 801 is implemented as an embedded controller. In various embodiments, the controller 801 and the NVM media 803 implement a solid-state drive (SSD).

The controller 801 also has a command interface configured to receive commands and send responses to the host 805. In embodiments implementing a plurality of non-volatile memory channels, the controller 801 also includes unified message-based communications circuitry (e.g., message fabric, NVM event fabric back pressure bus, etc.) coupling the multiple instances of memory channel controllers to a back-end processing unit (BEPU) providing scheduling and/or data management of the plurality of non-volatile memory devices 807. In further embodiments, the BEPU comprises data buffering and direct memory access (DMA) engines to store data or other information and to move the data or other information between the host 805 and the NVM media 803 using one or more memory channel controllers within the controller 801.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. A system comprising:
a plurality of processors, each of the plurality of processors comprising a plurality of respective communication first-in first-out buffers (FIFOs), said plurality of respective communication FIFOs comprising one or more respective hardware unit input FIFOs, one or more respective hardware unit output FIFOs, and a plurality of respective processor output FIFOs, wherein (i) each of the processors has an instruction set including at least one message sending instruction which, when executed, sends a message via at least one of the plurality of respective communication FIFOs and (ii) each of the processors is enabled to send messages to others of the processors via the respective processor output FIFOs;
a message fabric coupling the processors via at least some of the plurality of respective communication FIFOs; and
a plurality of hardware units, each of the processors associated with a respective one or more of the hardware units and coupled to each of the associated hardware units via one of the respective hardware unit input FIFOs and via one of the respective hardware unit output FIFOs,
wherein the respective hardware units associated with each of the processors are enabled to send messages to the associated processor via the respective hardware unit input FIFOs.

2. The system according to claim 1, wherein the instruction set further includes at least one message receiving instruction which, when executed, configures a respective one of the processors to receive a message via at least one of the plurality of respective communication FIFOs.

3. The system according to claim 1, wherein each of the processors is enabled to receive messages from others of the processors via respective processor input FIFOs.

4. The system according to claim 1, wherein the at least one message sending instruction sends one portion of a one or more portion message.

5. The system according to claim 4, wherein the at least one message sending instruction sends a message comprising a first portion of a header type and zero or more portions of a data type.

6. The system according to claim 5, wherein the first portion of the message comprises an operation tag associating the message with a particular one of a plurality of input/output (I/O) operations.

7. The system according to claim 6, wherein the system is enabled to receive commands to perform the I/O operations from a host when operatively coupled to said host.

8. The system according to claim 1, wherein a particular one of the hardware units is coupled to the message fabric and is enabled to receive messages from a first one of the processors via the respective hardware unit input FIFO of the first processor and to receive messages from a second one of the processors via the message fabric.

9. The system according to claim 8, wherein the respective hardware unit input FIFO of the first processor is directly coupled to the particular hardware unit.

10. The system according to claim 1, wherein at least one of the hardware units is enabled to receive messages from another one of the hardware units via the message fabric.

11. The system according to claim 1, wherein at least one of the hardware units is a direct memory access (DMA) engine.

12. The system according to claim 1, wherein the message fabric additionally couples one or more of the hardware units.

13. A method of handling message-based communications between modules of a solid-state drive / non-volatile memory controller comprising the steps of:
configuring a plurality of memories, each coupled to one of a plurality of processors as a plurality of respective communication FIFOs of the respective processor, wherein (i) said plurality of respective communication FIFOs comprises one or more respective hardware unit input FIFOs, one or more respective hardware unit output FIFOs, and a plurality of respective processor output FIFOs, and (ii) each of the processors comprises an instruction set including at least one message sending instruction which, when executed, sends a message via at least one of the plurality of respective communication FIFOs of the respective processors;
coupling the processors via at least some of the plurality of communication FIFOs to a message fabric, wherein each of the processors is enabled to send messages to others of the processors via the respective processor output FIFOs; and
coupling each of the processors to at least one of a plurality of hardware units associated with a respective one or more of the processors and coupled to each of the associated hardware units via one of said respective hardware unit input FIFOs and via one of said respective hardware unit output FIFOs,
wherein the respective hardware units associated with each of the processors are enabled to send messages to the associated processor via the respective hardware unit input FIFOs.

14. The method according to claim 13, wherein the instruction set further includes at least one message receiving instruction which, when executed, configures a respective one of the processors to receive a message via at least one of the plurality of respective communication FIFOs.

15. The method according to claim 13, further comprising:
coupling a particular one of the hardware units to the message fabric; and
enabling the particular one of the hardware units to receive messages from a first one of the processors via the respective hardware unit input FIFO of the first processor and to receive messages from a second one of the processors via the message fabric.

16. The method according to claim 15, further comprising:
directly coupling the respective hardware unit input FIFO of the first processor to the particular hardware unit.

17. The method according to claim 13, further comprising:
enabling at least one of the hardware units to receive messages from another one of the hardware units via the message fabric.

18. The system according to claim 1, wherein two of the processors that communicate frequently have a directly coupled connection.

19. The system according to claim 1, further comprising a plurality of the message fabrics coupling different subsets of the processors.

20. The system according to claim 1, further comprising a plurality of the message fabrics, each of the message fabrics communicating at least one of a different type of message, a different priority of message, and a different type and priority of message.

* * * * *